C. S. JOHNSTON.

SECTIONAL WHEEL RIM.

APPLICATION FILED MAY 27, 1919.

Reissued Sept. 16, 1919.

14,723.

Inventor:
C. S. Johnston
By Paul & Paul
his Attorneys.

UNITED STATES PATENT OFFICE.

CLARENCE S. JOHNSTON, OF GLENDIVE, MONTANA.

SECTIONAL WHEEL-RIM.

14,723. Specification of Reissued Letters Patent. Reissued Sept. 16, 1919.

Original No. 1,274,274, dated July 30, 1918, Serial No. 170,747, filed May 24, 1917. Application for reissue filed May 27, 1919. Serial No. 300,205.

*To all whom it may concern:*

Be it known that I, CLARENCE S. JOHNSTON, citizen of the United States, residing at Glendive, in the county of Dawson and State of Montana, have invented a new and useful Sectional Wheel-Rim, of which the following is a specification.

It is the object of this invention to provide novel means for producing circumferential movement of a demountable rim with respect to a felly, to the end that mutually inclined parts on the rim and on the felly may coact.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described, it being understood that changes in the precise embodiment of the invention herein disclosed can be made within the scope of what is claimed without departing from the spirit of the invention.

In the accompanying drawings:—

Figure 1:
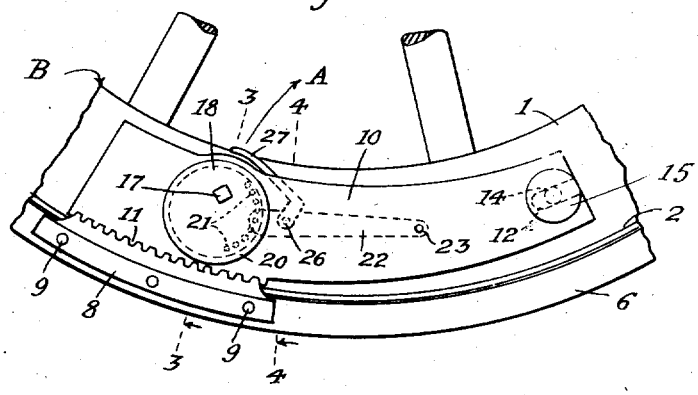
Figure 1 shows in side elevation, a portion of a wheel whereunto the device forming the subject matter of this application has been applied.
Figure 2:
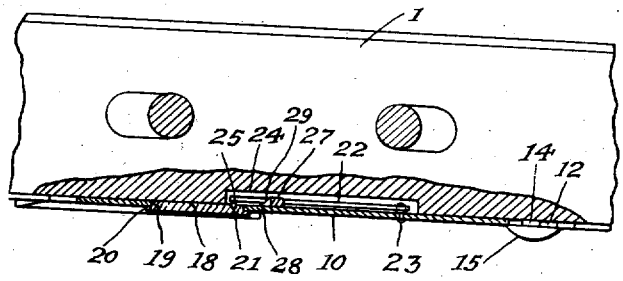
Fig. 2 is a plan view showing the inner face of the felly, parts being broken away.
Figure 3:
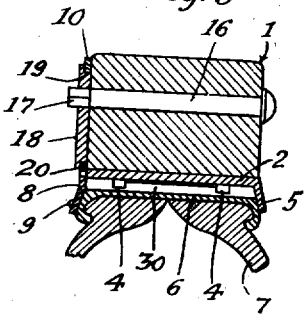
Fig. 3 is a cross section on the line 3—3 of Fig. 1.
Figure 4:
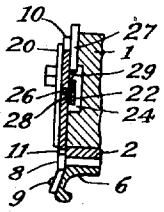
Fig. 4 is a cross section on the line 4—4 of Fig. 1.
Figure 6:
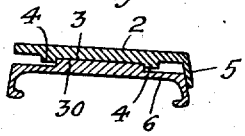
Fig. 6 is a cross section taken approximately on the line 6—6 of Fig. 5.
Figure 5:
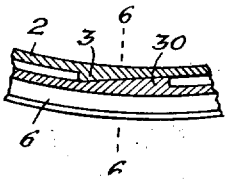
Fig. 5 is a fragmental longitudinal section taken through the felly band and the demountable rim and showing the mutually inclined, wedge-shaped elements of these parts.

The letter B denotes a wheel body comprising a felly 1 circumscribed by a felly band 2. The felly band 2 is supplied with longitudinally extended wedges 3 located between ribs 4 on the felly band. The felly band 2 is supplied with a side flange 5. The numeral 6 denotes a demountable rim carrying a tire 7. The demountable rim 6 has wedges coacting with the wedges 3 of the felly band 2 when the demountable rim is moved circumferentially with respect to the felly band. In practical operation, the demountable rim 6 is slid transversely of the felly band 2 until the demountable rim abuts against the side flange 5. Then, if the demountable rim is moved circumferentially with respect to the felly band 2, the wedges 30 coact with the wedges 3, between the ribs 4, in a manner common in devices of this kind and well understood in the art.

A means is provided whereby the demountable rim 6 may be moved circumferentially of the felly band 2, and this means will now be described. A rack bar 8 is secured as shown at 9 to the demountable rim 6 and extends longitudinally thereof. Extended longitudinally of the felly 1 at one side thereof is a plate 10 having teeth 11 adapted to coact in a manner to be described hereinafter, with the teeth of the rack bar 8 on the demountable rim 6. In one end, the plate 10 is provided with a slot 12 through which passes a securing device 14 entering the felly 1, the securing device having a head 15 which overlaps the outer face of the plate 10 beyond the slot 12. The construction is such that the plate 10 is mounted on the felly 1 for movement circumferentially of the felly, and for pivotal movement in a plane parallel to the median plane of the wheel, or radially of the wheel.

Disposed transversely on the felly 1 and journaled for rotation therein is a shaft 16 having a squared end 17 to which is secured an eccentric 18 journaled for rotation in an opening 19 in the plate 10. The eccentric 18 may have a flange 20 overlapping the outer face of the plate 10. In the inner side of the eccentic 18, openings 21 are formed, the same being disposed in the arc of a circle. Extended along the inner side of the plane 10 is a spring strip 22, one end of which is secured as shown at 23 to the plate 10. The felly 1 is supplied with a recess 24 adapted to receive the spring 22 when the same is moved transversely, by a mechanism to be described hereinafter. The free end of the spring 22 is provided with an outwardly extended projection 25 adapted to be received in the openings 21 of the eccentric 18. Pivoted at 26 to the plate 10 and located on the inner side thereof is an angular lever 27 including a reduced end 28 received between the spring 22 and the inner face of the eccentric 18. The lever 27 is provided with a beveled surface 29 disposed inwardly of the end 28.

In practical operation, when it is desired to impart a circumferential movement to the demountable rim 6, in order that the wedges 30 and 3 may be interengaged, the shaft 16 is rotated by means of a wrench or key, applied to the squared end 17 of the shaft. When the shaft 16 is rotated, the eccentric 18 is rotated, and when the eccentric 18 is is rotated, the plate 10 will be moved radially of the wheel in a direction parallel to the median plane of the wheel, the teeth 11 on the plate 10 being interengaged with the teeth of the rack bar 8, and when the rotation of the shaft 16 is continued, a longitudinal movement is imparted to the plate 10, the slot 12 in the end of the plate permitting a sliding movement of the plate 10 with respect to the securing device 14. When the plate 10 is moved longitudinally, after the teeth 11 have been engaged with the rack bar 8, the demountable rim 6 will be moved circumferentially of the felly band 2, for the purpose hereinbefore set forth. During the operation above described, the lever 27 is swung over in the direction of the arrow A in Fig. 1, the beveled surface 29 of the lever entering between the spring 22 and the eccentric 18, and retracting the projection 25 on the spring out of folding relation with respect to the opening 21, to the end that the eccentric 18 may be rotated as aforesaid. After the rim 6 has been moved circumferentially, by the action of the eccentric 18 on the plate 10, the lever 27 may be swung in a direction opposite to that indicated by the arrow A in Fig. 1, and then the beveled portion 29 of the lever will be retracted from the spring 22 whereupon the projection 25 will enter one of the openings 21 and hold the eccentric 18 against rotation. Since the eccentric 18 thus is held against rotation, a longitudinal movement of the plate 10 is prevented, and the rim 6 cannot move circumferentially of the felly band 2 and effect a disengagement of the wedges 3 and 30.

I claim as my invention:

1. In a device of the class described, a wheel body; a rim circumscribing the body; the rim and the body having circumferentially inclined parts which coact when the rim is moved circumferentially of the body; a plate pivoted to the body for movement circumferentially of the body and radially of the body in a direction parallel to the median plane of the body and the rim having interchanging elements; and an eccentric journaled on the body and journaled in the plate, the eccentric constituting means for moving the plate radially of the body to bring said elements into engagement, and constituting means for having the rim circumferentially of the body.

2. In a device of the class described, a wheel body; a rim circumscribing the body, the rim and the body having circumferentially inclined parts which coact when the rim is moved circumferentially of the body; a plate pivoted to the body for movement circumferentially of the body for movement radially of the body in a direction parallel to the median plane of the body, the plate and the rim having interengaging elements; an eccentric journaled on the body and journaled in the plate, the eccentric constituting means for moving the plate radially of the body to bring said elements into engagement, and constituting means for moving the plate and the rim circumferentially of the body; and means for engaging the eccentric to prevent a rotation of the eccentric.

3. In a device of the class described, a wheel body; a rim circumscribing the body, the rim and the body having circumferentially inclined parts which coact when the rim is moved circumferentially of the body; a plate pivoted to the body for movement circumferentially of the body and radially of the body in a direction parallel to the median plane of the body, the plate and the rim having interengaging elements; an eccentric journaled on the body and in the plate, the eccentric constituting means for bringing said elements into engagement, and for moving the plate and the rim circumferentially of the body; a latch carried by the plate and engaging the eccentric to hold the same against rotation; and means under the control of an operator, for manipulating the latch with respect to the eccentric.

4. In a device of the class described, a wheel body, a rim circumscribing the body, the rim and the body having locking lugs which coact when the rim is moved circumferentially, means on the body arranged to move radially into and out of engagement with the rim, and when in engagement with the rim to move said rim in either direction circumferentially of the body.

5. In a device of the class described, a wheel body, a rim circumscribing the body, the rim and the body having locking lugs which coact when the rim is moved circumferentially of the body, a rim engaging and moving plate mounted on said body, and means for moving said plate radially into engagement with said rim, and then circumferentially with said rim.

6. In a device of the class described, a wheel body, a rim circumscribing the body, the rim and the body having locking lugs which coact when the rim is moved circumferentially, means mounted on said body and arranged to move radially into engagement with said rim to move said rim circumferentially, and to lock said rim in any position to which it may be moved.

7. In a device of the class described, a wheel body, a rim circumscribing the body, a plate secured to the body and movable radially and circumferentially thereon, and means for moving said plate into engagement with said rim, and thereafter moving the plate and the rim together circumferentially of the body.

In witness whereof, I have hereunto set my hand this 15th day of May, 1919.

CLARENCE S. JOHNSTON.

Witnesses:

C. H. REHFUSS,

MARGARET R. DE CYLISE.